(12) United States Patent
Shachar et al.

(10) Patent No.: US 12,475,227 B2
(45) Date of Patent: Nov. 18, 2025

(54) BIOS PROTECTION USING REQUEST INTERCEPTION AND APPROVAL OF BIOS MODIFICATIONS

(71) Applicant: Dell Products L.P., Round Rock, TX (US)

(72) Inventors: Tomer Shachar, Beer Sheva (IL); Ophir Buchman, Raanana (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 214 days.

(21) Appl. No.: 18/123,005

(22) Filed: Mar. 17, 2023

(65) Prior Publication Data
US 2024/0311486 A1 Sep. 19, 2024

(51) Int. Cl.
*G06F 21/57* (2013.01)
*G06F 9/4401* (2018.01)

(52) U.S. Cl.
CPC .......... *G06F 21/572* (2013.01); *G06F 9/4403* (2013.01); *G06F 2221/034* (2013.01)

(58) Field of Classification Search
CPC .............. G06F 21/572; G06F 9/4403; G06F 2221/034; G06F 8/65; G06F 8/654; G06F 9/4401
See application file for complete search history.

(56) References Cited

U.S. PATENT DOCUMENTS

| 11,409,607 | B1 * | 8/2022 | Hung | G06F 11/076 |
| 2014/0237576 | A1 * | 8/2014 | Zhang | G06F 21/32 726/7 |
| 2023/0169171 | A1 * | 6/2023 | Jayakumar | G06F 21/575 726/22 |
| 2023/0305833 | A1 * | 9/2023 | Zhang | G06F 9/4418 |

OTHER PUBLICATIONS

"What is Bios?"; updated Feb. 18, 2023; https://www.easytechjunkie.com/what-is-bios.htm; downloaded on Mar. 14, 2023.
"Use Device Firmware Configuration Interface(DFCI) Profiles on Windows Devices in Microsoft Intune"; dated Mar. 2, 2023 https://learn.microsoft.com/en-us/mem/intune/configuration/device-firmware-configuration-interface-windows; downloaded on Mar. 14, 2023.
Ferreira, Joao; "Microsoft Intune: Windows Driver and Firmware Management"; https://m365admin.handsontek.net/microsoft-intune-windows-driver-and-firmware-management/; downloaded on Mar. 14, 2023.

* cited by examiner

*Primary Examiner* — Mohammad W Reza
(74) *Attorney, Agent, or Firm* — Ryan, Mason & Lewis, LLP

(57) ABSTRACT

Techniques are provided for basic input/output system (BIOS) protection using BIOS modification interception and approval. One method comprises, by an entity associated with an operating system of a device, obtaining a request to perform a reboot and/or a shutdown of the processing device; determining, prior to performing the reboot and/or the shutdown, whether an update of a BIOS of the device is pending; generating an approval request, responsive to (Continued)

determining that the update of the BIOS is pending and prior to performing the reboot and/or the shutdown; and initiating an automated action, responsive to a result of the approval request. In some embodiments, a BIOS update flag may be reset and/or a BIOS staging environment may be cleared following the updating of the image, responsive to a user not approving the update.

20 Claims, 7 Drawing Sheets

BIOS PROTECTION USING REQUEST INTERCEPTION AND APPROVAL OF BIOS MODIFICATIONS

FIELD

The field relates generally to information processing systems, and more particularly to the protection of devices in such information processing systems.

BACKGROUND

Computing devices are typically configured to incorporate security functionality to protect such devices from malicious activity. For example, it is generally desirable to prevent suspicious computer operations, and to ensure that operations are implemented by legitimate and authorized users. Role-based access control (RBAC) techniques may be employed to restrict access to devices or network resources based on the roles of individual users within an organization. RBAC techniques typically allow users to access only the information and other resources needed for their jobs and prevent users from accessing additional resources. RBAC techniques, however, are vulnerable to various types of attacks, such as password theft and/or session hijacking. A need exists for improved techniques for protecting devices from suspicious and/or unauthorized computer operations.

SUMMARY

In one embodiment, a method comprises obtaining, by at least one entity associated with an operating system of at least one processing device comprising a processor coupled to a memory, a request to perform one or more of a reboot and a shutdown of the at least one processing device; determining, by the at least one entity, prior to performing the one or more of the reboot and the shutdown, whether an update of a basic input/output system (BIOS) of the at least one processing device is pending; generating, by the at least one entity, an approval request, responsive to determining that the update of the BIOS is pending and prior to performing the one or more of the reboot and the shutdown; and initiating, by the at least one entity, one or more automated actions, responsive to a result of the approval request.

In some embodiments, a BIOS update flag may be reset and/or a BIOS staging environment may be cleared following the updating of the image, responsive to a user not approving the update. At least one BIOS chip may be updated using an image of a new BIOS version, upon completion of a boot process, responsive to a user approving the update. The image of the new BIOS version may be stored in a BIOS staging environment of the at least one BIOS chip by an operating system of the at least one processing device.

In one or more embodiments, prior to the determining whether the update of the BIOS is pending, a BIOS production environment of at least one BIOS chip comprises a production BIOS version and wherein a BIOS staging environment comprises an image of a new BIOS version. The one or more automated actions may comprise suspending the one or more of the reboot and the shutdown; providing at least one notification to a user; providing at least one instruction to a user; and/or providing at least one software tool to a user. The determining whether the update of the BIOS is pending may comprise detecting that a BIOS update flag is set and/or detecting that a BIOS staging environment comprises an image of a different BIOS version than a version of the BIOS. The at least one entity associated with the operating system may comprise at least one software entity associated with an operating system kernel.

Other illustrative embodiments include, without limitation, apparatus, systems, methods and computer program products comprising processor-readable storage media.

DETAILED DESCRIPTION

Figure 1:
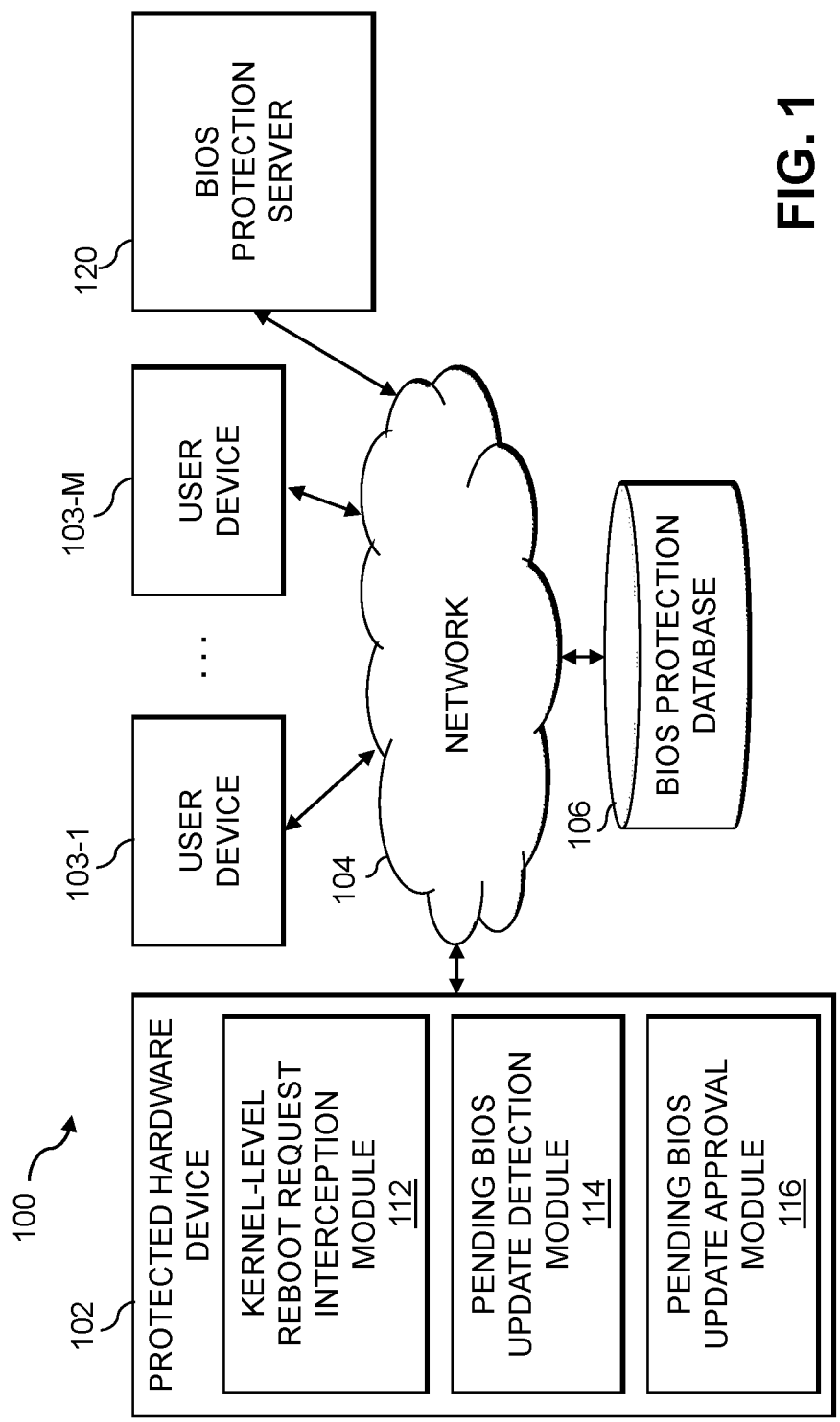
FIG. 1 illustrates an information processing system configured for BIOS protection using request interception and approval of BIOS modifications in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for BIOS protection using request interception and approval of BIOS modifications.

The BIOS of a given device initializes hardware components of the given device during a boot process and allows the hardware components to properly communicate and work together during device startup. One or more aspects of the disclosure recognize that malicious or unauthorized modifications of a BIOS chip or metadata associated with the BIOS chip may cause a denial of service or permit an unauthorized operating system to be loaded (sometimes referred to as a backdoor attack that may cause unpredictable damage). In addition, users may be unaware of pending BIOS changes while the operating system is running, and may only become aware of a BIOS changes during the next boot cycle. Meanwhile, the installation of such BIOS changes has already taken place. A BIOS chip is thus important for the proper operation of a given device, and if the BIOS chip is corrupted or damaged, the given device will typically be unable to start up. In addition, a recovery of the BIOS when the BIOS chip is corrupted or damaged is typically complex, costly, and may require a hardware replacement.

In one or more embodiments, the disclosed pre-execution device reboot interception techniques allow a user to submit a command to reboot or shutdown a device. In at least some embodiments, the command is intercepted by an entity associated with an operating system (e.g., an entity associated with an operating system kernel) of the device, prior to an execution of the user command, and the user command is only executed following a user approval of a pending BIOS update.

In one or more embodiments, techniques are provided for BIOS protection using request interception and approval of BIOS modifications. In some embodiments, when a user requests to reboot or shutdown a device, while an update of the BIOS update is pending, the user may be notified of the pending BIOS update and asked to approve the application of the pending BIOS update. The user request to reboot or shutdown the device may be cancelled, and the user given an opportunity to remediate the BIOS in response to the user not approving the pending BIOS update. The user request to reboot or shutdown the device may be allowed in response to the user approving the pending BIOS update (which will result in the BIOS being updated as part of the boot process).

In some embodiments, the disclosed BIOS modification interception and approval techniques can be employed to protect a given device following a user request to reboot or shutdown a device and detection of a pending BIOS update (e.g., by a manual or an automated detection). The BIOS modification interception and approval techniques may be employed to protect the current BIOS and prevent the pending BIOS update from being installed unless the pending BIOS update is approved by a designated user. In this manner, the current BIOS will remain active to initiate the boot process, if elected by the user, that allows the operating system of the given device to load.

Among other benefits, the disclosed BIOS modification interception and approval techniques protect devices from unauthorized, erroneous and/or malicious actions that may impair the operation of a BIOS chip of a given device. Such actions can be detected and overcome using the disclosed BIOS modification interception and approval techniques.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more protected hardware devices 102, one or more BIOS protection servers 120 and one or more BIOS protection databases 106, discussed below.

The protected hardware devices 102 may comprise edge devices, host devices and other devices that execute user commands. One or more aspects of the disclosure recognize that edge devices, for example, are attractive targets for an attack and often comprise critical infrastructure that may require an evaluation of whether to execute certain commands and/or operations and/or whether the BIOS has been altered. Edge devices may be stored, for example, in a physical location that may not be properly secured. An attacker may be able to access a perimeter of a location of the edge device (or another adjacent or nearby location that is within range of the edge device).

The user devices 103 may comprise, for example, host devices and/or devices such as mobile telephones, laptop computers, tablet computers, desktop computers or other types of computing devices. Such devices are examples of what are more generally referred to herein as "processing devices" which may be protected using the disclosed device protection techniques. Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary protected hardware device 102 may comprise a kernel-level reboot request interception module 112, a pending BIOS update detection module 114, and a pending BIOS update approval module 116. In some embodiments, the kernel-level reboot request interception module 112 automatically detects a user attempt to reboot (or shutdown a device), as discussed further below. The pending BIOS update approval module 116 may be activated to request a user to approve the pending BIOS update in response to the pending BIOS update detection module 114 detecting the pending BIOS update.

It is to be appreciated that this particular arrangement of modules 112, 114, 116 illustrated in the protected hardware device 102 of the FIG. 1 embodiment is presented by way of example only, and alternative arrangements can be used in other embodiments. For example, the functionality associated with modules 112, 114, 116 in other embodiments can be combined into a single element, or separated across a larger number of elements. As another example, multiple distinct processors can be used to implement different ones of modules 112, 114, 116, or portions thereof.

At least portions of modules 112, 114, 116 may be implemented at least in part in the form of software that is stored in memory and executed by a processor. An exemplary process utilizing modules 112, 114, 116 of the protected hardware device 102 in computer network 100 will be described in more detail with reference to FIGS. 3 through 5, for example.

Other protected hardware devices 102 (not shown in FIG. 1) are assumed to be configured in a manner similar to that shown for protected hardware device 102 in the figure.

The BIOS protection server 120 may be implemented, for example, on the cloud, such as a private cloud, or on the premises of an enterprise or another entity. In some embodiments, the BIOS protection server 120, or portions thereof, may be implemented as part of a host device. The BIOS protection server 120 may implement server-side functionality associated with the disclosed BIOS modification interception and approval techniques, such as, for example, implementing performance monitoring and policies for protection requirements for BIOS chips.

Additionally, the protected hardware device 102 and/or the BIOS protection server 120 can have an associated BIOS protection database 106 configured to store, for example, a set of policies for BIOS protection and/or information related to various devices, such as one or more protected hardware devices 102, such as device locations, network address assignments and performance data. The BIOS protection database 106 may be maintained, for example, by the BIOS protection server 120 and accessible by one or more protected hardware devices 102.

The BIOS protection database 106 in the present embodiment is implemented using one or more storage systems associated with the BIOS protection server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more protected hardware devices 102, user devices 103 and/or BIOS protection servers 120 may be implemented on a common processing platform, or on separate processing platforms. The one or more protected hardware devices 102 and user devices 103 may be configured to interact over the network 104 in at least some embodiments with the BIOS protection server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more protected hardware devices 102, user devices 103 and/or BIOS protection servers 120 can be one or more input-output devices (not shown), which illustratively comprise keyboards, displays or other types of input-output devices in any combination. Such input-output devices can be used, for example, to support one or more user interfaces to the BIOS protection server 120, as well as to support communication between the BIOS protection server 120 and other related systems and devices not explicitly shown.

The one or more protected hardware devices 102, user devices 103 and/or BIOS protection servers 120 in the FIG. 1 embodiment are assumed to be implemented using at least one processing device. Each such processing device generally comprises at least one processor and an associated memory and implements one or more functional modules for controlling certain features of the respective device.

More particularly, the one or more protected hardware devices 102, user devices 103 and/or BIOS protection servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more protected hardware devices 102, user devices 103 and/or BIOS protection servers 120 to communicate in some embodiments over the network 104 with each other (as well as one or more other networked devices), and illustratively comprises one or more conventional transceivers.

It is to be understood that the particular set of elements shown in FIG. 1 for BIOS protection using request interception and approval of BIOS modifications is presented by way of illustrative example only, and in other embodiments additional or alternative elements may be used. Thus, another embodiment includes additional or alternative systems, devices and other network entities, as well as different arrangements of modules and other components.

Figure 2:
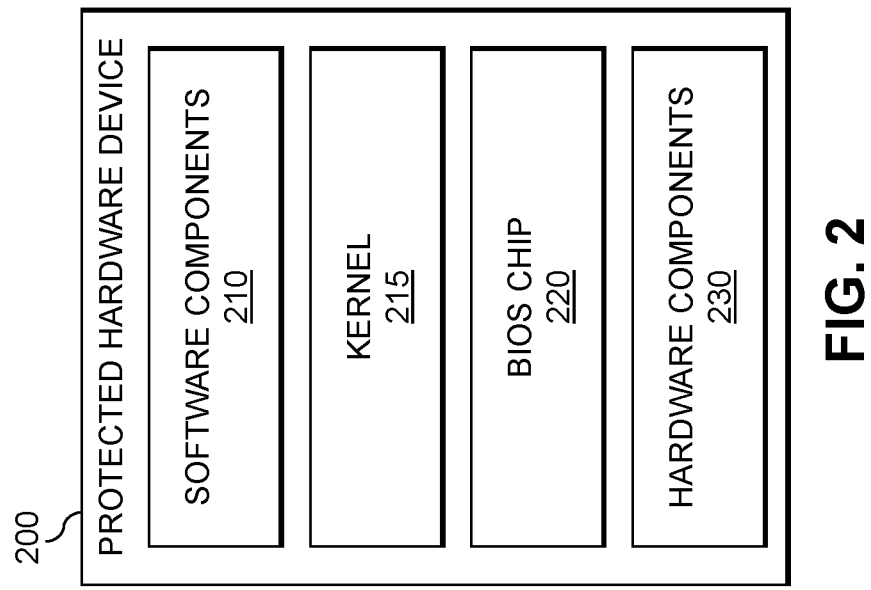
FIG. 2 illustrates the protected hardware device of FIG. 1 in further detail in accordance with an illustrative embodiment.

FIG. 2 illustrates a protected hardware device 200 in accordance with an illustrative embodiment. In the example of FIG. 2, the protected hardware device 200 comprises one or more software components 210, a kernel 215, a BIOS chip 220, and one or more hardware components 230. The BIOS chip 220 may be implemented, for example, as a BIOS (Basic Input Output System) chip, an Extensible Firmware Interface (EFI) BIOS chip, and/or a Unified Extensible Firmware Interface (UEFI) BIOS chip. The BIOS chip 220 typically initializes hardware during a boot process for a given device. A malicious modification of the BIOS or metadata associated with the BIOS can cause a denial of service or permit an unauthorized operating system to be loaded (sometimes referred to as a backdoor attack that may cause unpredictable damage).

A kernel 215 (e.g., resident in the memory of the protected hardware device 200) may provide an interface between the software components 210 and the hardware components 230. The term kernel, as used herein, encompasses any computer program that is part of an operating system of a protected hardware device 200 that enables interactions between such software components 210, such as applications, and the hardware components 230 of the protected hardware device 200. The hardware components 230 may comprise, for example, processing components, memory components, storage components and other hardware components.

In one or more embodiments, a software entity associated with the kernel 215 intercepts user commands to reboot and/or shutdown a device, prior to the execution of such intercepted commands by the operating system of the protected hardware device 200, so that a request for user approval of a pending BIOS update may be performed. The kernel 215 may hold such intercepted user commands during the evaluation, and only release such intercepted user commands for execution upon a successful user approval of the pending BIOS update.

Figure 3:
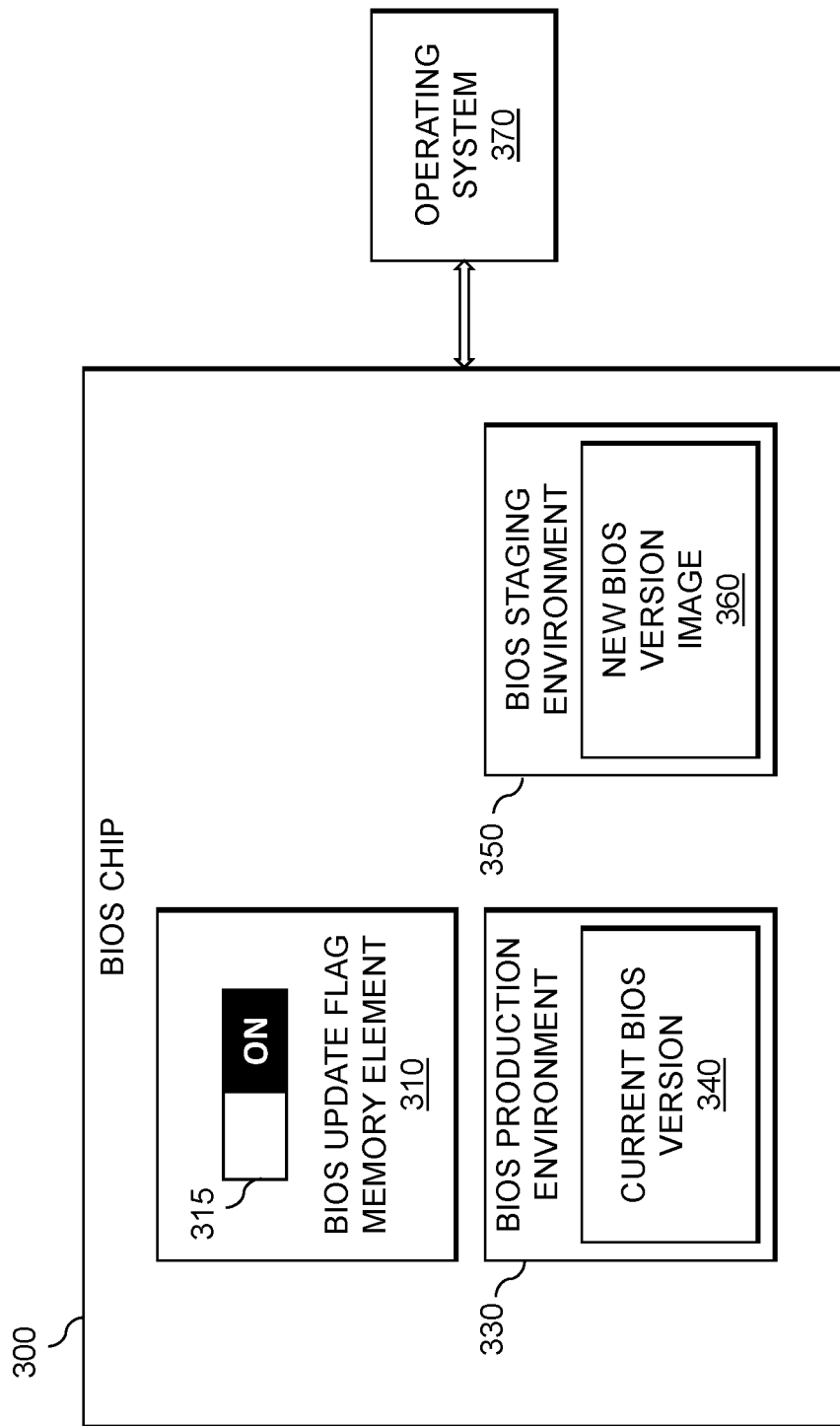
FIG. 3 illustrates a BIOS chip configured to employ BIOS modification interception and approval in accordance with an illustrative embodiment.

FIG. 3 illustrates a BIOS chip 300 of a protected hardware device configured to employ BIOS modification interception and approval in accordance with an illustrative embodiment. In the example of FIG. 3, the BIOS chip 300 comprises a BIOS update flag memory element 310 (e.g., storing a BIOS update flag value 315), a BIOS production environment 330, comprising a current BIOS version 340, and a BIOS staging environment 350, comprising a new BIOS version image 360. The BIOS chip 300 may be implemented, for example, as an EFI BIOS chip, and/or a UEFI BIOS chip, as modified herein to provide the disclosed BIOS modification interception and approval techniques. The BIOS chip 300 interacts with an operating system 370 of the protected hardware device.

In some embodiments, when a BIOS update is pending during a reboot or shutdown of a device, a user can be asked to approve the application of the pending BIOS update. A pending BIOS update may be detected using manual or automated detection techniques. For example, a user may learn of a pending BIOS update (e.g., if the user initiated the pending BIOS update in error and/or the user learns of an unauthorized pending BIOS update, for example, associated with malware). In some embodiments, an automated detection mechanism may detect that (i) the BIOS update flag value 315 is set (providing an indication of the pending BIOS update to be installed upon the next device reboot operation) and/or (ii) the BIOS staging environment 350 comprises a new BIOS version image 360 (to be installed upon the next device reboot operation).

In response to the detection of the pending BIOS update, the user may be notified of the pending BIOS update and the user may be asked to approve the application of the pending BIOS update. The user request to reboot or shutdown the device may be cancelled, and the user given an opportunity to remediate the BIOS, in response to the user not approving the pending BIOS update. In addition, the BIOS update flag value 315 may be reset and/or the BIOS staging environment 350 may be cleared of the new BIOS version image 360, when the user does not approve the pending BIOS update.

The user request to reboot or shutdown the device may be allowed in response to the user approving the pending BIOS update (which will typically result in the BIOS being updated as part of the boot process). The BIOS chip then continues to utilize the current BIOS to initialize the startup process of a protected hardware device.

Figure 4:
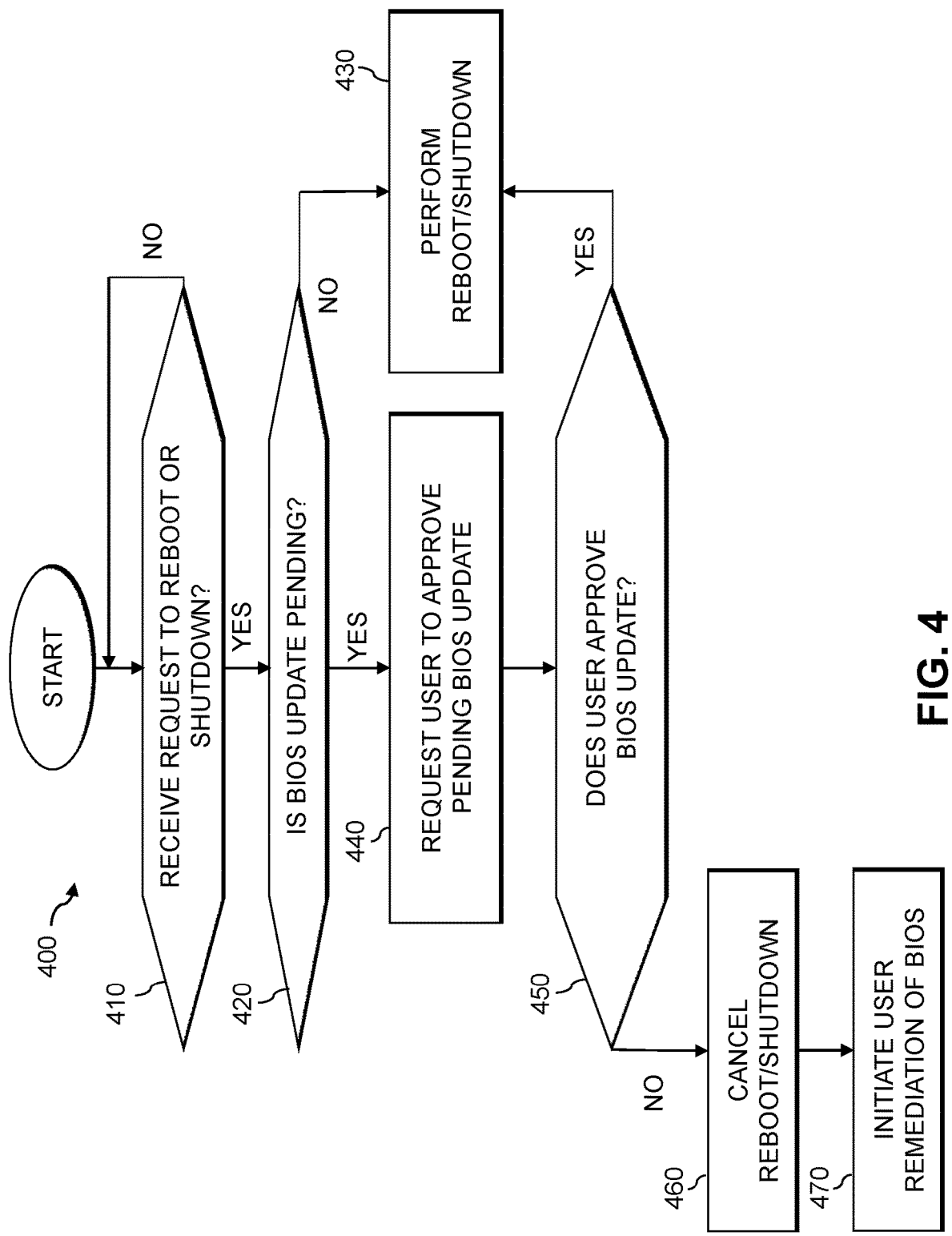
FIGS. 4 and 5 are flow charts illustrating exemplary implementations of processes for BIOS protection using request interception and approval of BIOS modifications in accordance with illustrative embodiments.

FIG. 4 is a flow chart illustrating an exemplary implementation of a process 400 for BIOS protection using request interception and approval of BIOS modifications in accordance with an illustrative embodiment. In at least some embodiments, the process 400 is implemented, for example, by a software entity associated with the kernel 215 of FIG. 2.

In the example of FIG. 4, the process 400 may perform a test in step 410 to determine if a request is received to reboot or shutdown a device. If it is determined in step 410 that a request is received to reboot or shutdown a device is not received, then program control returns to step 410 until such a request is received. Once it is determined in step 410 that a request is received to reboot or shutdown a device, then a further test is performed in step 420 to determine if a BIOS update is pending.

If it is determined in step 420 that a BIOS update is not pending, then program control proceeds to step 430 where the requested reboot or shutdown is performed. If, however, it is determined in step 420 that a BIOS update is pending, then the process 400 requests the user to approve the pending BIOS update in step 440.

A test is performed in step 450 to determine if the user approves the pending BIOS update. If it is determined in step 450 that the user does not approve the pending BIOS update, then the reboot or shutdown of the device is canceled in step 460 and a user remediation of the BIOS is initiated in step 470, if needed.

If it is determined in step 450 that the user does approve the pending BIOS update, then program control proceeds to step 430 where the requested reboot or shutdown is performed, and the pending BIOS update will be allowed to proceed to update the BIOS.

Figure 5:
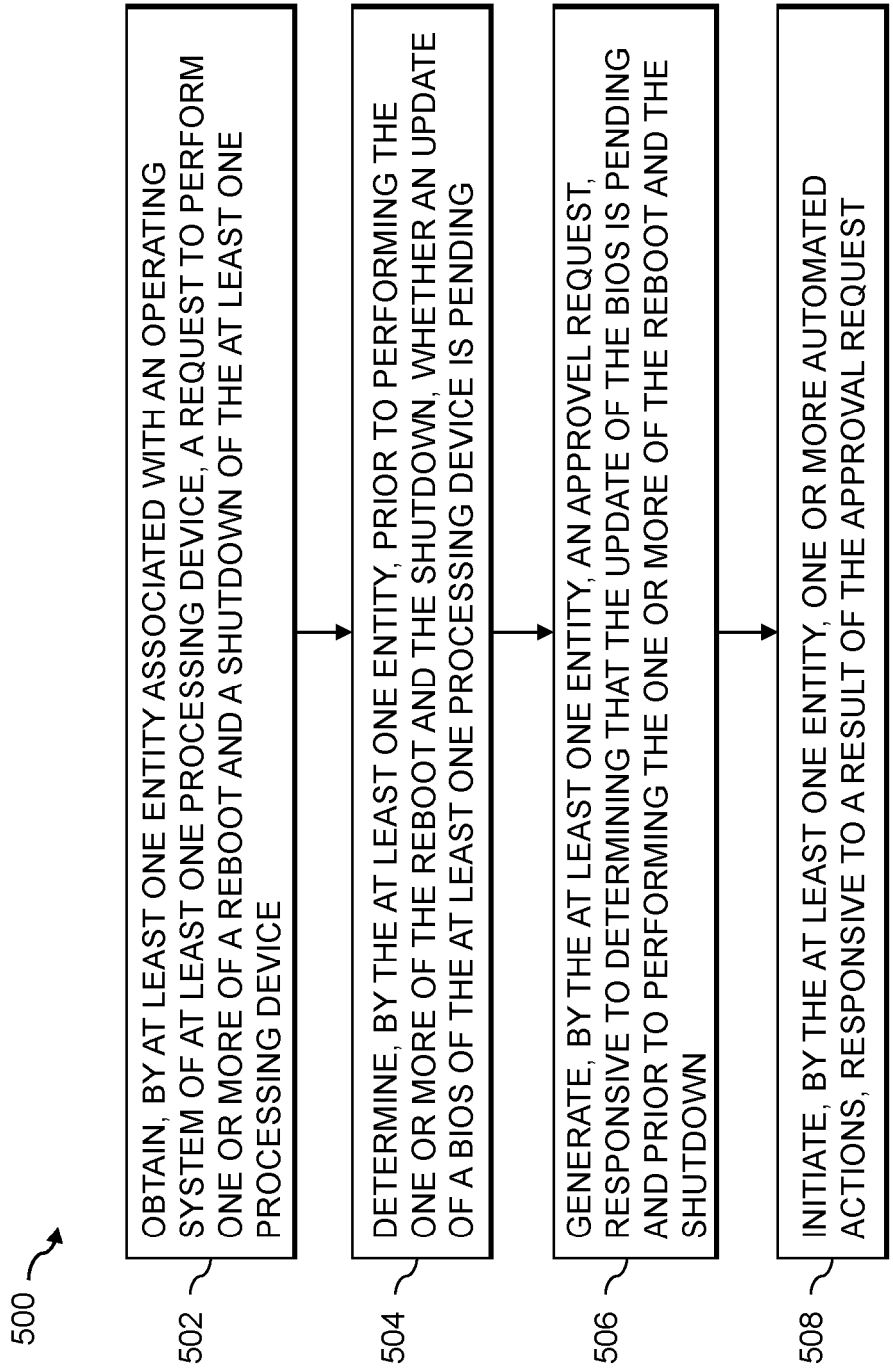

FIG. 5 is a flow chart illustrating an exemplary implementation of a process 500 for BIOS protection using request interception and approval of BIOS modifications in accordance with an illustrative embodiment. In the example of FIG. 5, the process 500 obtains, in step 502, by at least one entity associated with an operating system of at least one processing device, a request to perform one or more of a reboot and a shutdown of the at least one processing device.

In step 504, the at least one entity determines, prior to performing the one or more of the reboot and the shutdown, whether an update of a BIOS of the at least one processing device is pending. An approval request is generated by the at least one entity in step 506, responsive to determining that the update of the BIOS is pending and prior to performing the one or more of the reboot and the shutdown. One or more automated actions are initiated by the at least one entity in step 508, responsive to a result of the approval request.

In some embodiments, a BIOS update flag may be reset and/or a BIOS staging environment may be cleared following the updating of the image, responsive to a user not approving the update. At least one BIOS chip may be updated using an image of a new BIOS version, upon completion of a boot process, responsive to a user approving the update. The image of the new BIOS version may be stored in a BIOS staging environment of the at least one BIOS chip by an operating system of the at least one processing device.

In one or more embodiments, prior to the determining whether the update of the BIOS is pending, a BIOS production environment of at least one BIOS chip comprises a production BIOS version and wherein a BIOS staging environment comprises an image of a new BIOS version. The one or more automated actions may comprise suspending the one or more of the reboot and the shutdown; providing at least one notification to a user; providing at least one instruction to a user; and/or providing at least one software tool to a user. The determining whether the update of the BIOS is pending may comprise detecting that a BIOS update flag is set and/or detecting that a BIOS staging environment comprises an image of a different BIOS version than a version of the BIOS. The at least one entity associated with the operating system may comprise at least one software entity associated with an operating system kernel.

The particular processing operations and other network functionality described in conjunction with FIGS. 4 and 5, for example, are presented by way of illustrative example only, and should not be construed as limiting the scope of the disclosure in any way. Alternative embodiments can use other types of processing operations for BIOS protection using request interception and approval of BIOS modifications. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for BIOS protection using request interception and approval of BIOS modifications can be employed, for example, to protect a given device following a detection of a pending BIOS update during an intercepted reboot or shutdown of a device. The BIOS modification interception and approval techniques may protect the current BIOS and prevent the pending BIOS update from being installed, unless such pending BIOS update is approved by a user. In this manner, the current BIOS will remain active, if the pending BIOS update is not approved, to initiate the boot process that allows the operating system of the given device to load.

Among other benefits, the disclosed BIOS modification interception and approval techniques protect devices from unauthorized, erroneous and/or malicious actions that may impair the operation of a BIOS chip of a given device. Such actions can be detected and overcome using the disclosed BIOS modification interception and approval techniques.

One or more embodiments of the disclosure provide improved methods, apparatus and computer program products for BIOS protection using request interception and approval of BIOS modifications. The foregoing applications and associated embodiments should be considered as illustrative only, and numerous other embodiments can be configured using the techniques disclosed herein, in a wide variety of different applications.

It should also be understood that the disclosed BIOS modification interception and approval techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for BIOS protection using request interception and approval of BIOS modifications may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based BIOS modification interception and approval engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based BIOS modification interception and approval platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
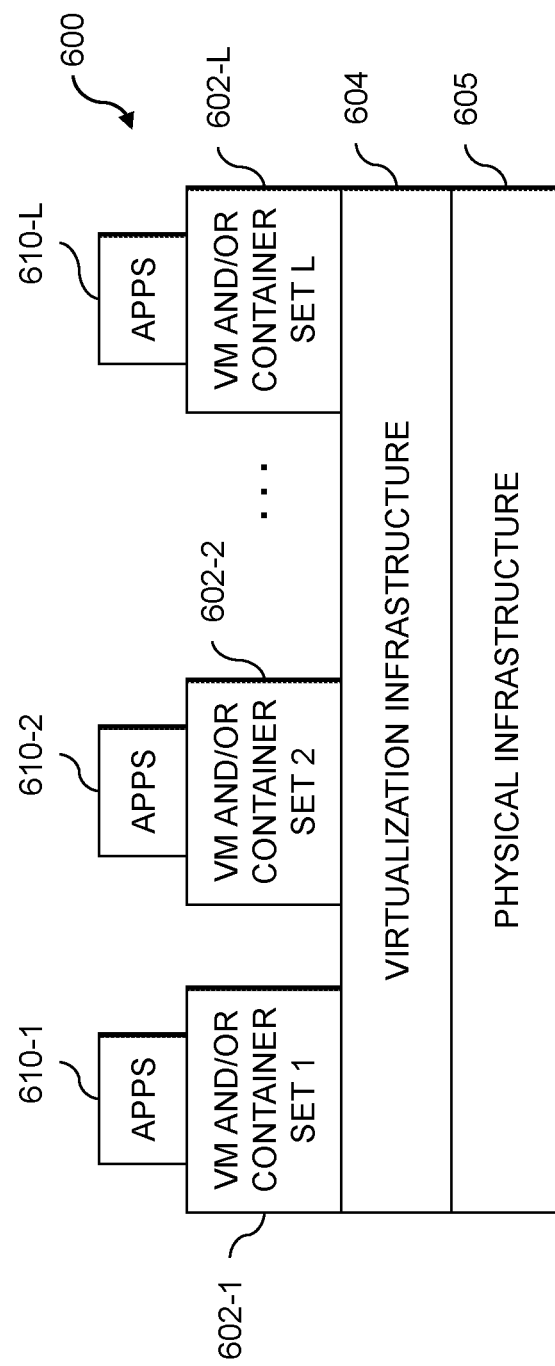
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide BIOS modification interception and approval functionality of the type described above for one or more processes running on a given one of the VMs. For example, each of the VMs can implement BIOS modification interception and approval control logic and associated BIOS protection functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide BIOS modification interception and approval functionality of the type described above for one or more processes running on different ones of the containers. For example, a container host device supporting multiple containers of one or more container sets can implement one or more instances of BIOS modification interception and approval control logic and associated BIOS protection functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
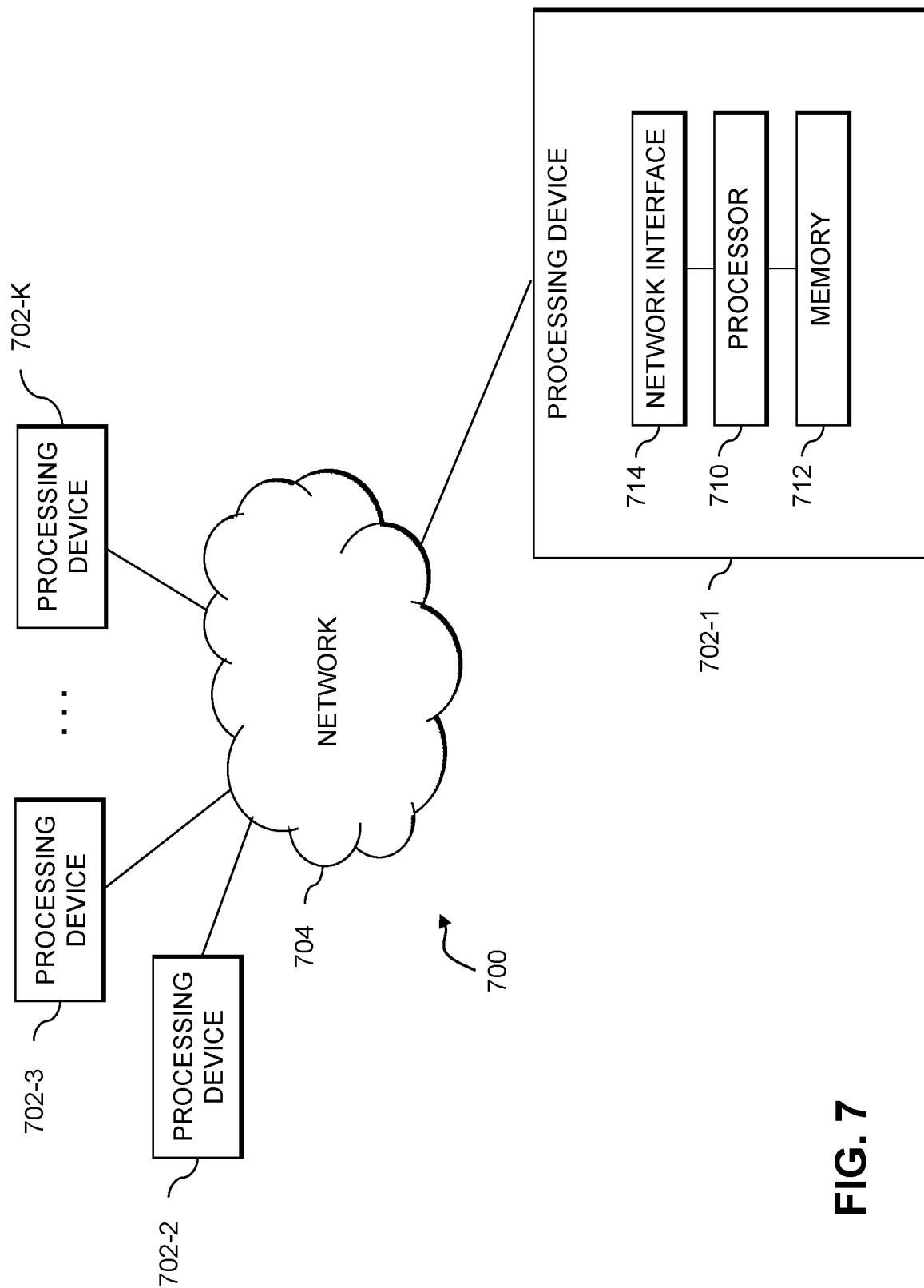
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining, by at least one entity associated with an operating system of at least one processing device, a request to perform one or more of a reboot and a shutdown of the at least one processing device;
    performing the following steps in response to the obtained request:
    determining, by the at least one entity, prior to performing the one or more of the reboot and the shutdown, whether an update of a basic input/output system (BIOS) of the at least one processing device is pending;
    generating, by the at least one entity, an approval request, responsive to determining that the update of the BIOS is pending and prior to performing the one or more of the reboot and the shutdown, wherein the approval request requests a user to approve the pending BIOS update; and
    initiating, by the at least one entity, one or more automated actions, responsive to a result of the approval request;
    wherein the method is performed by the at least one processing device, wherein the at least one processing device comprises a processor coupled to a memory.

2. The method of claim 1, further comprising one or more of resetting a BIOS update flag and clearing a BIOS staging environment, responsive to the user not approving the update.

3. The method of claim 1, further comprising updating at least one BIOS chip using an image of a new BIOS version, responsive to a user approving the update.

4. The method of claim 3, wherein the image of the new BIOS version is stored in a BIOS staging environment of the at least one BIOS chip by an operating system of the at least one processing device.

5. The method of claim 1, wherein, prior to the determining whether the update of the BIOS is pending, a BIOS production environment of at least one BIOS chip comprises a production BIOS version and wherein a BIOS staging environment comprises an image of a new BIOS version.

6. The method of claim 1, wherein the one or more automated actions comprise one or more of suspending the one or more of the reboot and the shutdown; providing at least one notification to a user; providing at least one instruction to a user; and providing at least one software tool to a user.

7. The method of claim 1, wherein the determining whether the update of the BIOS is pending comprises one or more of detecting that a BIOS update flag is set and detecting that a BIOS staging environment comprises an image of a different BIOS version than a version of the BIOS.

8. The method of claim 1, wherein the at least one entity associated with the operating system comprises at least one software entity associated with an operating system kernel.

9. An apparatus comprising:
    at least one processing device comprising a processor coupled to a memory;
    the at least one processing device being configured to implement the following steps:
    obtaining, by at least one entity associated with an operating system of the at least one processing device, a request to perform one or more of a reboot and a shutdown of the at least one processing device;
    performing the following steps in response to the obtained request:
    determining, by the at least one entity, prior to performing the one or more of the reboot and the shutdown, whether an update of a basic input/output system (BIOS) of the at least one processing device is pending;
    generating, by the at least one entity, an approval request, responsive to determining that the update of the BIOS is pending and prior to performing the one or more of the reboot and the shutdown, wherein the approval request requests a user to approve the pending BIOS update; and
    initiating, by the at least one entity, one or more automated actions, responsive to a result of the approval request.

10. The apparatus of claim 9, further comprising one or more of resetting a BIOS update flag and clearing a BIOS staging environment, responsive to the user not approving the update.

11. The apparatus of claim 9, further comprising updating at least one BIOS chip using an image of a new BIOS version, responsive to a user approving the update.

12. The apparatus of claim 9, wherein, prior to the determining whether the update of the BIOS is pending, a BIOS production environment of at least one BIOS chip comprises a production BIOS version and wherein a BIOS staging environment comprises an image of a new BIOS version.

13. The apparatus of claim 9, wherein the one or more automated actions comprise one or more of suspending the one or more of the reboot and the shutdown;
    providing at least one notification to a user; providing at least one instruction to a user;
    and providing at least one software tool to a user.

14. The apparatus of claim 9, wherein the determining whether the update of the BIOS is pending comprises one or more of detecting that a BIOS update flag is set and detecting that a BIOS staging environment comprises an image of a different BIOS version than a version of the BIOS.

15. A non-transitory processor-readable storage medium having stored therein program code of one or more software programs, wherein the program code when executed by at least one processing device causes the at least one processing device to perform the following steps:
- obtaining, by at least one entity associated with an operating system of the at least one processing device, a request to perform one or more of a reboot and a shutdown of the at least one processing device;
- performing the following steps in response to the obtained request:
- determining, by the at least one entity, prior to performing the one or more of the reboot and the shutdown, whether an update of a basic input/output system (BIOS) of the at least one processing device is pending;
- generating, by the at least one entity, an approval request, responsive to determining that the update of the BIOS is pending and prior to performing the one or more of the reboot and the shutdown, wherein the approval request requests a user to approve the pending BIOS update; and
- initiating, by the at least one entity, one or more automated actions, responsive to a result of the approval request.

16. The non-transitory processor-readable storage medium of claim 15, further comprising one or more of resetting a BIOS update flag and clearing a BIOS staging environment, responsive to the user not approving the update.

17. The non-transitory processor-readable storage medium of claim 15, further comprising updating at least one BIOS chip using an image of a new BIOS version, responsive to a user approving the update.

18. The non-transitory processor-readable storage medium of claim 15, wherein, prior to the determining whether the update of the BIOS is pending, a BIOS production environment of at least one BIOS chip comprises a production BIOS version and wherein a BIOS staging environment comprises an image of a new BIOS version.

19. The non-transitory processor-readable storage medium of claim 15, wherein the one or more automated actions comprise one or more of suspending the one or more of the reboot and the shutdown; providing at least one notification to a user; providing at least one instruction to a user; and providing at least one software tool to a user.

20. The non-transitory processor-readable storage medium of claim 15, wherein the determining whether the update of the BIOS is pending comprises one or more of detecting that a BIOS update flag is set and detecting that a BIOS staging environment comprises an image of a different BIOS version than a version of the BIOS.

* * * * *